United States Patent
Kang

(10) Patent No.: US 8,666,334 B2
(45) Date of Patent: Mar. 4, 2014

(54) APPARATUS AND METHOD FOR VIRTUAL ANTENNA MAPPING IN MULTI-ANTENNA SYSTEM

(75) Inventor: Jee-Woong Kang, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 275 days.

(21) Appl. No.: 13/048,701

(22) Filed: Mar. 15, 2011

(65) Prior Publication Data

US 2011/0223876 A1    Sep. 15, 2011

(30) Foreign Application Priority Data

Mar. 15, 2010  (KR) .......................... 10-2010-0022768

(51) Int. Cl.
*H04B 1/02* (2006.01)

(52) U.S. Cl.
USPC ............................ 455/101; 375/267; 370/335

(58) Field of Classification Search
USPC ................ 455/91, 101, 102, 103, 115.1, 126, 455/127.1; 375/267, 295, 296; 370/334, 370/335

See application file for complete search history.

(56) References Cited

U.S. PATENT DOCUMENTS

| | | | |
|---|---|---|---|
| 2012/0004014 A1* | 1/2012 | Ding et al. | 455/561 |
| 2012/0087346 A1* | 4/2012 | Lee et al. | 370/335 |
| 2012/0155571 A1* | 6/2012 | Yang | 375/295 |

* cited by examiner

Primary Examiner — Thanh Le

(57) ABSTRACT

An apparatus and a method for mapping virtual antennas and physical antennas in a wireless communication system. The method for mapping the virtual antennas and the physical antennas includes generating at least two virtual antenna signals for at least two virtual antennas. The method also includes generating at least two physical antenna signals by applying a corresponding matrix, which maps the at least two virtual antennas and the at least two physical antennas in many-to-many relation, to the at least two virtual antenna signals. The method further includes transmitting the at least two physical antenna signals over respective physical antennas.

20 Claims, 3 Drawing Sheets

APPARATUS AND METHOD FOR VIRTUAL ANTENNA MAPPING IN MULTI-ANTENNA SYSTEM

CROSS-REFERENCE TO RELATED APPLICATION(S) AND CLAIM OF PRIORITY

The present application is related to end claims priority under 35 U.S.C. §119(a) to a Korean patent application filed in the Korean Intellectual Property Office on Mar. 15, 2010, and assigned Serial No. 10-2010-0022768, the entire disclosure of which is hereby incorporated by reference.

TECHNICAL FIELD OF THE INVENTION

The present invention relates generally to an apparatus and a method for virtual antenna mapping in a multi-antenna system. More particularly, the present invention relates to a virtual antenna mapping apparatus and method for uniform power distribution of a physical antenna in the multi-antenna system.

BACKGROUND OF THE INVENTION

Antennas of a wireless communication system are often classified as either a virtual antenna called an antenna port, or a physical antenna for actually sending and receiving signals. In general, the virtual antenna and the physical antenna of the wireless communication system correspond to each other by 1:1.

To detect a signal, a receiving stage estimates a channel between the virtual antenna of a transmitting stage and the antenna of the receiving stage, and detects a size of the transmit signal and phase modulation using the channel. The transmitting stage sends a reference signal per virtual antenna so that the receiving stage can estimate the channel of the virtual antenna.

The reference signal is allocated for the receiving stage to estimate the channel to the transmitting stage. To reject interference from a traffic channel, a resource is allocated separately from the traffic channel. For example, when the transmitting stage includes four virtual antennas, it allocates the reference signal to each virtual antenna as shown in FIG. 1.

FIG. 1 depicts the resources of the reference signal in a conventional multi-antenna system. Hereafter, it is assumed that the multi-antenna system employs an Orthogonal Frequency Division Multiplexing (OFDM) scheme.

When the transmitting stage includes four virtual antennas as shown in FIG. 1, it sends the reference signal over 0-th, fourth, seventh and eleventh OFDM symbols of the 0-th virtual antenna and the first virtual antenna. The transmitting stage sends the references signal over the first and eighth OFDM symbols of the second virtual antenna and the third virtual antenna. That is, the transmitting stage allocates the resources of the reference signal to send the reference signal over the same OFDM symbols of the 0-th virtual antenna and the first virtual antenna and to send the reference signal over the same OFDM symbols of the second virtual antenna and the third virtual antenna.

As sending the reference signal, the transmitting stage does not transmit any signal at the same location as the reference signal transmission location of the different virtual antennas in the resources of the virtual antennas.

As sending the reference signal per virtual antenna, the transmitting stage sends the reference signal with a transmit power four times the transmit power of the traffic per resource block. In the tone carrying the traffic, except for the reference signal, every virtual antenna of the transmitting stage sends the signal with the same transmit power.

Accordingly, the power used by the symbol carrying the reference signal per virtual antenna varies per virtual antenna. For example, when the transmit power of the traffic is set to A, over the 0-th, fourth, seventh, and eleventh OFDM symbols in FIG. 1, the 0-th virtual antenna and the first virtual antenna consume the power of 4 A and the second virtual antenna and the third virtual antenna consume the power of 2 A.

Further, when the virtual antennas and the physical antennas correspond to each other by 1:1, the power imbalance of the virtual antennas causes imbalance in the power of the physical antennas. As a result, each physical antenna needs to be designed on different bases.

SUMMARY OF THE INVENTION

To address the above-discussed deficiencies of the prior art, it is a primary aspect of the present invention to provide an apparatus and a method for uniformly distributing power to physical antennas in a multi-antenna system.

Another aspect of the present invention is to provide an apparatus and a method for mapping virtual antennas and physical antennas in a many-to-many correspondence in a multi-antenna system.

Another aspect of the present invention is to provide an apparatus and a method for generating a corresponding matrix to map virtual antennas and physical antennas in a many-to-many correspondence in a multi-antenna system.

An aspect of the present invention is to provide an apparatus and a method for generating a corresponding matrix to map virtual antennas and physical antennas in a many-to-many correspondence by considering a precoding vector in a multi-antenna system.

According to one aspect of the present invention, a method for transmitting a signal at a transmitting stage of a wireless communication system is provided. The method includes generating at least two virtual antenna signals for at least two virtual antennas. The method also includes generating at least two physical antenna signals by applying a corresponding matrix to the at least two virtual antenna signals, the corresponding matrix mapping the at least two virtual antennas and the at least two physical antennas in a many-to-many relation. The method further includes transmitting the at least two physical antenna signals over respective physical antennas.

According to another aspect of the present invention, an apparatus method for transmitting a signal at a transmitting stage of a wireless communication system is provided. The apparatus includes at least two physical antennas. The apparatus also includes a signal generator configured to generate at least two virtual antenna signals for at least two virtual antennas. The apparatus further includes a virtual antenna mapper configured to generate at least two physical antenna signals by applying a corresponding matrix, which maps the at least two virtual antennas and the at least two physical antennas in a many-to-many relation, to the at least two virtual antenna signals. The virtual antenna mapper is also configured to provide the at least two physical antenna signals to the respective physical antennas.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
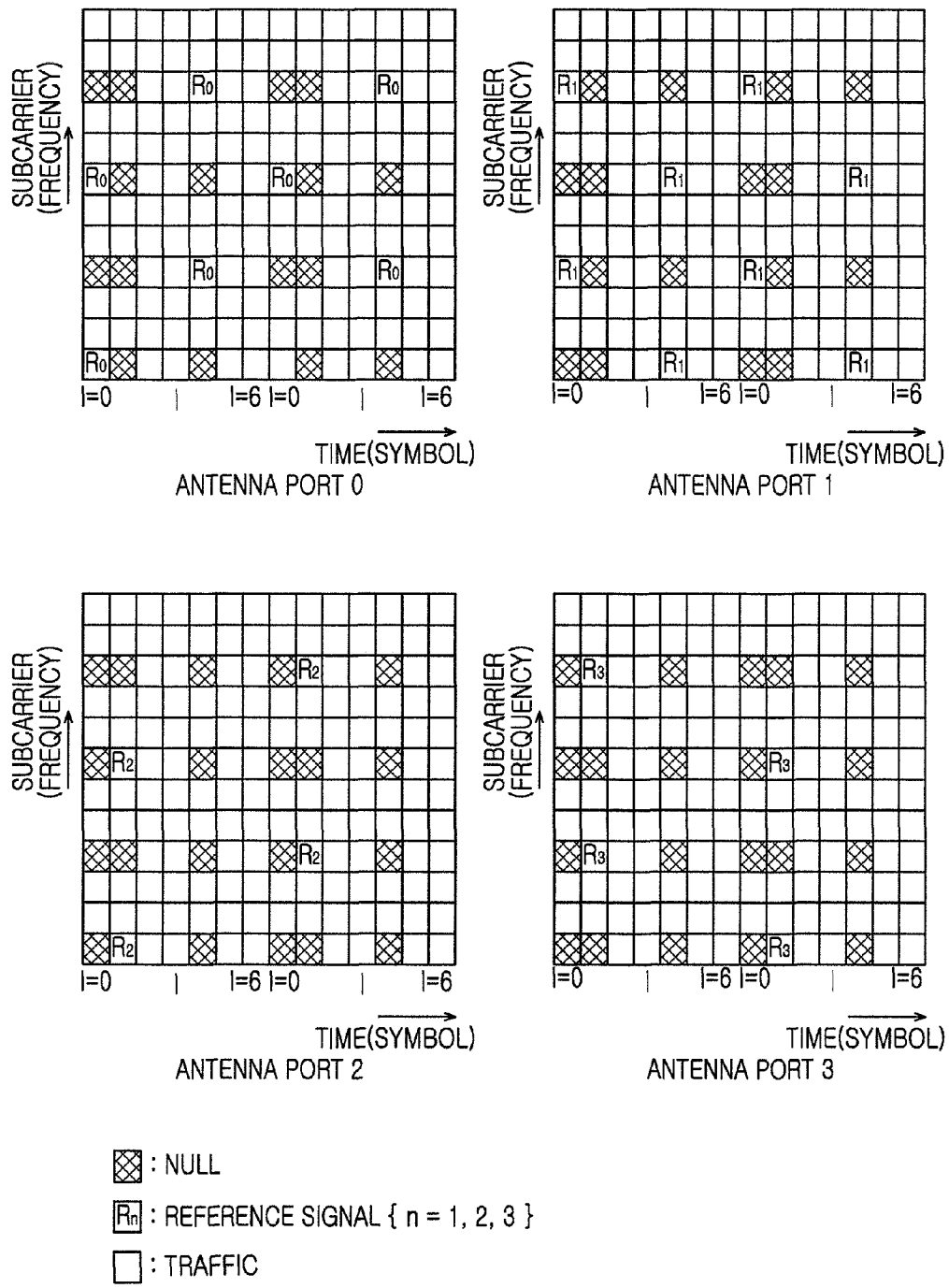
FIG. 1 illustrates resources of a reference signal in a conventional multi-antenna system.
Figure 2:
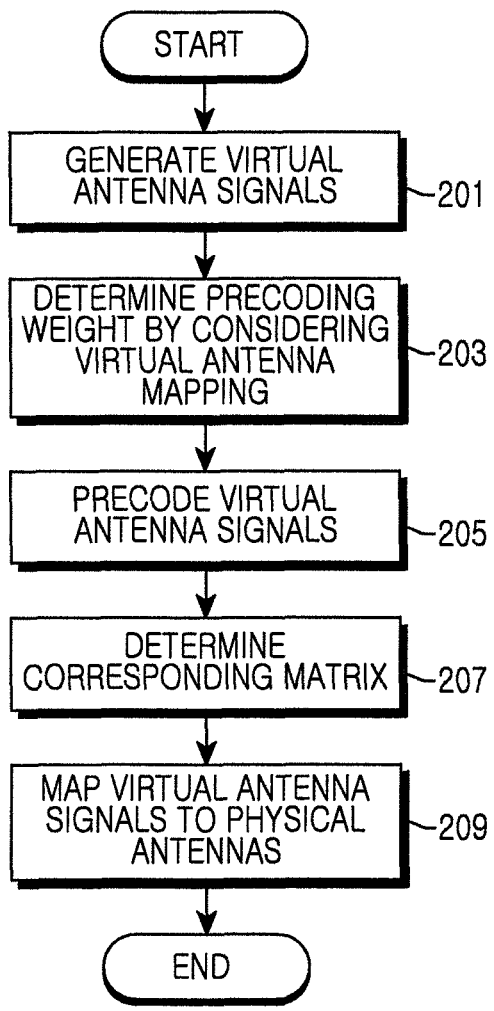
FIG. 2 illustrates a method for sending a signal at a transmitting stage in a multi-antenna system according to an embodiment of the present invention.
Figure 3:
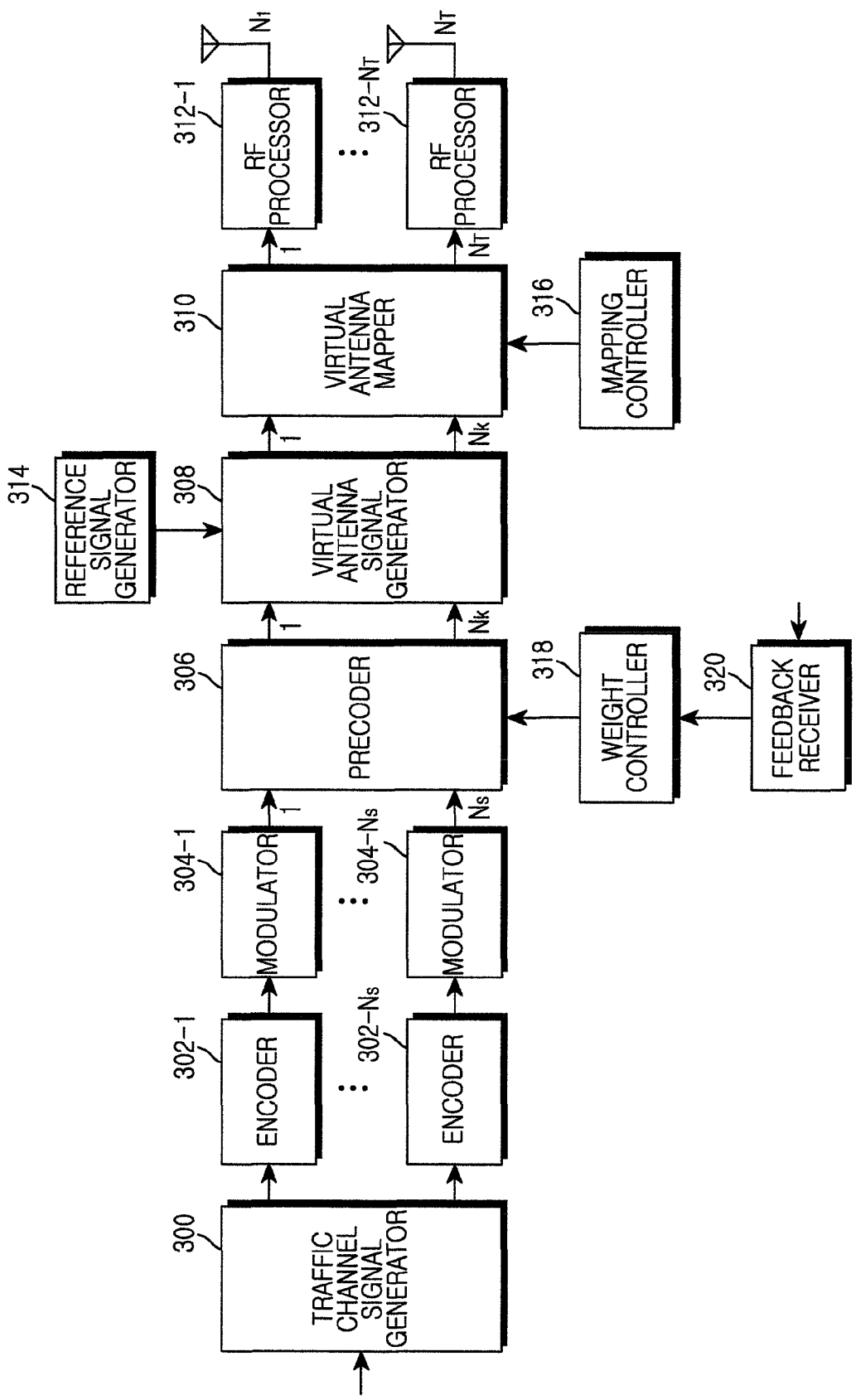
FIG. 3 illustrates the transmitting stage in the multi-antenna system according to an embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Exemplary embodiments of the present invention provide a technique for uniformly distributing power for at least two physical antennas in a multi-antenna system.

Hereinafter, the multi-antenna system is assumed to adopt Orthogonal Frequency Division Multiplexing (OFDM)/Orthogonal Frequency Division Multiple Access (OFDMA). Note that other communication schemes are equally applicable to the multi-antenna system.

It is assumed that the multi-antenna system employs a closed-loop spatial multiplexing scheme among multi-antenna transmission schemes. Notably, the present invention is equally applicable to various multi-antenna transmission schemes.

A transmitting stage of the multi-antenna system is assumed to include $N_T$ physical antennas and $N_K$ virtual antennas. Herein, $N_T$ and $N_K$ can be of the same value or different values. Hereafter, it is assumed that $N_T$ and $N_K$ are four (4). That is, it is assumed that the transmitting stage includes four physical antennas and four virtual antennas.

To uniformly distribute power for the virtual antennas to the physical antennas, the transmitting stage uses a corresponding matrix having the same unitary properties with an absolute value one-half (½) of each element. For instance, the transmitting stage can map the virtual antennas and the physical antennas in many-to-many correspondence using the corresponding matrix based on Equation 1. Herein, the corresponding matrix indicates a mathematical expression of the correspondence of the virtual antennas and the physical antennas.

$$DFT \text{ Matrix: } \begin{bmatrix} z_0 \\ z_1 \\ z_2 \\ z_3 \end{bmatrix} = \frac{1}{2} \begin{bmatrix} 1 & 1 & 1 & 1 \\ 1 & -j & -1 & j \\ 1 & -1 & 1 & -1 \\ 1 & j & -1 & -j \end{bmatrix} \cdot \begin{bmatrix} y_0 \\ y_1 \\ y_2 \\ y_3 \end{bmatrix} \quad [\text{Eqn. 1}]$$

$$\text{Hadamard Matrix: } \begin{bmatrix} z_0 \\ z_1 \\ z_2 \\ z_3 \end{bmatrix} = \frac{1}{2} \begin{bmatrix} 1 & 1 & 1 & 1 \\ 1 & 1 & -1 & -1 \\ 1 & -1 & 1 & -1 \\ 1 & -1 & -1 & 1 \end{bmatrix} \cdot \begin{bmatrix} y_0 \\ y_1 \\ y_2 \\ y_3 \end{bmatrix}$$

In Equation 1, $z_i$ (i=0, 1, 2, 3) denotes a signal of the physical antenna, $y_i$ (i=0, 1, 2, 3) denotes a signal of the virtual antenna, and i denotes an index of the physical antenna and the virtual antenna.

Using the corresponding matrix as stated above, the transmitting stage can address a power imbalance of symbols carrying a reference signal by mapping the virtual antennas and the physical antennas by 4:4. That is, the transmitting stage can uniformly map the signals for the virtual antennas to the four physical antennas using the corresponding matrix and thus address the power imbalance of the physical antennas in the symbols carrying the reference signal.

When the multi-antenna system rejects interference of a neighbor cell and uses a precoding scheme to raise the transmission efficiency, the transmitting stage sends the signal using a precoding matrix and the corresponding matrix together based on Equation 2. Herein, Equation 2 utilizes the DFT matrix of Equation 1 as the corresponding matrix. It is assumed that Equation 2 adopts the precoding matrix of the 0-th index of the rank 1 among 4 Tx CL-SM precode defined by 3GPP TS 36.211 of LTE standard document.

$$\begin{bmatrix} z_0 \\ z_1 \\ z_2 \\ z_3 \end{bmatrix} = \frac{1}{2} \begin{bmatrix} 1 & 1 & 1 & 1 \\ 1 & -j & -1 & j \\ 1 & -1 & 1 & -1 \\ 1 & j & -1 & -j \end{bmatrix} \cdot \frac{1}{2} \begin{bmatrix} 1 \\ 1 \\ 1 \\ 1 \end{bmatrix} \cdot [W_0] \quad [\text{Eqn. 2}]$$

In Equation 2, $z_i$ (i=0, 1, 2, 3) denotes the signal of the physical antenna, i denotes the index of the physical antenna, $$\begin{bmatrix} 1 \\ 1 \\ 1 \\ 1 \end{bmatrix}$$

denotes the precoding matrix, and $[W_0]$ denotes a signal before the precoding.

When the precoding matrix and the corresponding matrix are used together as expressed in Equation 2, the signals of the virtual antennas fade and the signal is not delivered to the antennas other than the 0-th physical antenna. That is, the power imbalance occurs between the 0-th physical antenna and the other antennas.

Hence, the transmitting stage designs the corresponding matrix to satisfy the following conditions.

(1) The power of the physical antennas should be uniformly distributed for the un-precoded reference signal.

(2) When the precoding matrix and the corresponding matrix are applied concurrently, precoding vectors of a precoding codebook should include precoding vectors of the power uniformly distributed of the physical antennas, more than a reference number.

(3) The precoding vector satisfying the condition (2) should have an equivalent vector in the precoding codebook applied with the corresponding matrix. Herein, the equivalent vector indicates the vector of the constant phase difference between the elements in the precoding vector, for the sake of the same beamforming effect.

To meet the condition (1) and the condition (2) at the same time, the multi-antenna system designs the corresponding matrix to map two virtual antenna combinations to two physical antenna combinations. For instance, when the combination of the 0-th and second virtual antennas and the combination of the first and third virtual antennas are used, the transmitting stage can express the correspondence of the virtual antenna combinations and the physical antenna combinations as Equation 3.

$$\begin{bmatrix} z_0 \\ z_1 \\ z_2 \\ z_3 \end{bmatrix} = \frac{1}{2} \begin{bmatrix} a & 0 & b & 0 \\ 0 & e & 0 & f \\ c & 0 & d & 0 \\ 0 & g & 0 & h \end{bmatrix} \cdot \begin{bmatrix} y_0 \\ y_1 \\ y_2 \\ y_3 \end{bmatrix}$$ [Eqn. 3]

In Equation 3, $z_i$ (i=0, 1, 2, 3) denotes the signal of the physical antenna, $y_i$ (i=0, 1, 2, 3) denotes the signal of the virtual antenna, i denotes the index of the physical antenna and the virtual antenna, and a, b, c, d, e, f, g, h denote the elements of the corresponding matrix.

When the designed corresponding matrix of Equation 3 is used, the corresponding matrix should include elements which satisfy a condition of Equation 4, so as to uniformly distribute the power of the physical antennas and not to reduce the channel capacity.

$$|a| = |b| = |c| = |d| = |e| = |f| = |g| = |h| = 1$$ [Eqn. 4]

$$d = -\frac{a^*}{b^*}c, \quad h = -\frac{e^*}{f^*}g$$

a, b, c, d, e, f, g, h denote the elements of the corresponding matrix.

In the corresponding matrix of Equation 4, the absolute value of the elements, which are not zero, of the corresponding matrix should be the same and the unitary property should be satisfied.

To meet the condition (2), the corresponding matrix should be designed by considering characteristics of the precoding codebook. For example, when the transmitting stage designs the corresponding matrix by considering the rank 1 precoding vector of the downlink closed-loop codebook of the LTE standard, the rank 1 precoding vector can be represented as shown in Table 1.

TABLE 1

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Precoding vector | 1 | 1 | 1 | 1 | 1 | 1 | 1 | 1 | 1 | 1 | 1 | 1 | 1 | 1 | 1 | 1 |
| | 1 | $-j$ | $-1$ | $j$ | $\frac{1}{\sqrt{2}}(1-j)$ | $\frac{1}{\sqrt{2}}(-1-j)$ | $\frac{1}{\sqrt{2}}(-1+j)$ | $\frac{1}{\sqrt{2}}(1+j)$ | 1 | $-j$ | $-1$ | $j$ | 1 | 1 | $-1$ | $-1$ |
| | 1 | $-1$ | 1 | $-1$ | $-j$ | $j$ | $-j$ | $j$ | $-1$ | 1 | $-1$ | 1 | 1 | $-1$ | 1 | $-1$ |
| | 1 | $j$ | $-1$ | $-j$ | $\frac{1}{\sqrt{2}}(-1-j)$ | $\frac{1}{\sqrt{2}}(1-j)$ | $\frac{1}{\sqrt{2}}(1+j)$ | $\frac{1}{\sqrt{2}}(-1+j)$ | $-1$ | $-j$ | 1 | $j$ | $-1$ | 1 | 1 | $-1$ |

In Table 1, twelve precoding vectors excluding the fourth through seventh precoding vectors have the following properties.

(1) All of a 0-th weight and a second weight of the precoding vector are real numbers. That is, a phase difference between the 0-th weight and the second weight in each precoding vector is 0° or 180°.

(2) All of a first weight and a third weight of the precoding vector are real or imaginary numbers. That is, the phase difference between the first weight and the third weight in each precoding vector is 0° or 180°.

When the corresponding matrix is designed by considering the properties of the precoding vector, each element of the corresponding matrix of Equation 3 should be designed to satisfy Equation 5.

i) $a=jb, c=-jd$ or $a=-jb, c=jd$ ii) $e=jf, g=-jh$ or $e=-jf, g=jh$ [Eqn. 5]

The multi-antenna system can design the corresponding matrix of Equation 3 to meet the condition of Equation 4 and the condition of Equation 5. In this situation, the corresponding matrix can uniformly distribute the power of the physical antennas even when the precoding vectors other than the fourth through seventh precoding vectors of Table 1 are used together. For example, the corresponding matrix designed based on Equation 3 to meet the condition of Equation 4 and the condition of Equation 5 is derived as Equation 6.

$$\frac{1}{\sqrt{2}}\begin{bmatrix} a & 0 & ja & 0 \\ 0 & e & 0 & je \\ c & 0 & -jc & 0 \\ 0 & g & 0 & -jg \end{bmatrix} \text{ or } \frac{1}{\sqrt{2}}\begin{bmatrix} a & 0 & -ja & 0 \\ 0 & e & 0 & je \\ c & 0 & jc & 0 \\ 0 & g & 0 & -jg \end{bmatrix} \quad \text{[Eqn. 6]}$$

$$\text{or } \frac{1}{\sqrt{2}}\begin{bmatrix} a & 0 & ja & 0 \\ 0 & e & 0 & -je \\ c & 0 & -jc & 0 \\ 0 & g & 0 & jg \end{bmatrix} \text{ or } \frac{1}{\sqrt{2}}\begin{bmatrix} a & 0 & -ja & 0 \\ 0 & e & 0 & -je \\ c & 0 & jc & 0 \\ 0 & g & 0 & jg \end{bmatrix}$$

where, $|a| = |c| = |e| = |g| = 1$

When a, c, e, g satisfying the condition (3) are applied in the corresponding matrix of Equation 6, the corresponding matrix can be arranged as expressed in Equation 7.

$$\frac{a}{\sqrt{2}}\begin{bmatrix} 1 & 0 & j & 0 \\ 0 & j & 0 & -1 \\ -j & 0 & -1 & 0 \\ 0 & 1 & 0 & -j \end{bmatrix} \text{ or } \frac{a}{\sqrt{2}}\begin{bmatrix} 1 & 0 & j & 0 \\ 0 & -j & 0 & 1 \\ -j & 0 & -1 & 0 \\ 0 & -1 & 0 & j \end{bmatrix} \quad \text{[Eqn. 7]}$$

$$\text{or } \frac{a}{\sqrt{2}}\begin{bmatrix} 1 & 0 & j & 0 \\ 0 & j & 0 & -1 \\ j & 0 & 1 & 0 \\ 0 & -1 & 0 & j \end{bmatrix} \text{ or } \frac{a}{\sqrt{2}}\begin{bmatrix} 1 & 0 & j & 0 \\ 0 & -j & 0 & 1 \\ j & 0 & 1 & 0 \\ 0 & 1 & 0 & -j \end{bmatrix}$$

$$\text{or } \frac{a}{\sqrt{2}}\begin{bmatrix} 1 & 0 & -j & 0 \\ 0 & -1 & 0 & -j \\ j & 0 & -1 & 0 \\ 0 & j & 0 & 1 \end{bmatrix} \text{ or } \frac{a}{\sqrt{2}}\begin{bmatrix} 1 & 0 & -j & 0 \\ 0 & 1 & 0 & j \\ j & 0 & -1 & 0 \\ 0 & -j & 0 & -1 \end{bmatrix}$$

$$\text{or } \frac{a}{\sqrt{2}}\begin{bmatrix} 1 & 0 & -j & 0 \\ 0 & 1 & 0 & j \\ -j & 0 & 1 & 0 \\ 0 & j & 0 & 1 \end{bmatrix} \text{ or } \frac{a}{\sqrt{2}}\begin{bmatrix} 1 & 0 & -j & 0 \\ 0 & -1 & 0 & -j \\ -j & 0 & 1 & 0 \\ 0 & -j & 0 & -1 \end{bmatrix}$$

$$\text{or } \frac{a}{\sqrt{2}}\begin{bmatrix} 1 & 0 & j & 0 \\ 0 & 1 & 0 & -j \\ -j & 0 & -1 & 0 \\ 0 & j & 0 & -1 \end{bmatrix} \text{ or } \frac{a}{\sqrt{2}}\begin{bmatrix} 1 & 0 & j & 0 \\ 0 & -1 & 0 & j \\ -j & 0 & -1 & 0 \\ 0 & -j & 0 & 1 \end{bmatrix}$$

$$\text{or } \frac{a}{\sqrt{2}}\begin{bmatrix} 1 & 0 & j & 0 \\ 0 & -1 & 0 & j \\ j & 0 & 1 & 0 \\ 0 & j & 0 & -1 \end{bmatrix} \text{ or } \frac{a}{\sqrt{2}}\begin{bmatrix} 1 & 0 & j & 0 \\ 0 & 1 & 0 & -j \\ j & 0 & 1 & 0 \\ 0 & -j & 0 & 1 \end{bmatrix}$$

$$\text{or } \frac{a}{\sqrt{2}}\begin{bmatrix} 1 & 0 & -j & 0 \\ 0 & j & 0 & 1 \\ j & 0 & -1 & 0 \\ 0 & -1 & 0 & -j \end{bmatrix} \text{ or } \frac{a}{\sqrt{2}}\begin{bmatrix} 1 & 0 & -j & 0 \\ 0 & -j & 0 & -1 \\ j & 0 & -1 & 0 \\ 0 & 1 & 0 & j \end{bmatrix}$$

$$\text{or } \frac{a}{\sqrt{2}}\begin{bmatrix} 1 & 0 & -j & 0 \\ 0 & j & 0 & 1 \\ -j & 0 & 1 & 0 \\ 0 & 1 & 0 & j \end{bmatrix} \text{ or } \frac{a}{\sqrt{2}}\begin{bmatrix} 1 & 0 & -j & 0 \\ 0 & -j & 0 & -1 \\ -j & 0 & 1 & 0 \\ 0 & -1 & 0 & -j \end{bmatrix}$$

where $|a| = 1$

The condition (3) is that the precoding codebook with the corresponding matrix applied includes the precoding vector and the equivalent vector. That is, the precoding vector applying any one of the corresponding matrices of Equation 7 to the 0-th through third precoding vectors and the eighth through fifteenth precoding vectors of Table 1, is equivalent to any one of the precoding vectors of Table 1.

In the actual implementation, the corresponding matrix of Equation 7 increases complexity in the multiplication by $$\frac{a}{\sqrt{2}}.$$

Accordingly, when a is set to the value of the phase 45°, 135°, 225°, and 315° such as $$\frac{(1+j)}{\sqrt{2}}, \frac{(1-j)}{\sqrt{2}}, \frac{(-1-j)}{\sqrt{2}}, \text{ and } \frac{(-1+j)}{\sqrt{2}},$$

the transmitting stage can lower the complexity by reducing the multiplication. For example, when a is set to $$\frac{(1+j)}{\sqrt{2}},$$

the corresponding matrix can be expressed as

Equation 8.

$$\frac{1}{2}\begin{bmatrix} 1+j & 0 & -1+j & 0 \\ 0 & -1+j & 0 & -1-j \\ 1-j & 0 & -1-j & 0 \\ 0 & 1+j & 0 & 1-j \end{bmatrix} \quad \text{[Eqn. 8]}$$

When a is set to $$\frac{(1+j)}{\sqrt{2}}$$

in Equation 8, the complexity can be reduced by mapping the physical antennas merely with addition of the real component and the imaginary component of the virtual antenna signal.

In this embodiment, the multi-antenna system designs the corresponding matrix by considering the rank 1 precoding vector of the downlink closed-loop codebook of the LIE standard.

Alternatively, when the precoding vectors of rank 2, 3 and 4 of the downlink closed-loop codebook are considered, the multi-antenna system can design the corresponding matrix in the above-stated manner.

Now, a method of the transmitting stage for sending the signal using the virtual antenna mapping is explained.

FIG. 2 illustrates a method for sending a signal at the transmitting stage in the multi-antenna system according to an embodiment of the present invention.

In step 201, the transmitting stage generates the virtual antenna signals. That is, the transmitting stage generates the reference signal for each virtual antenna and the signal for the traffic channel.

In step 203, the transmitting stage determines the precoding weight determined based on the virtual antenna mapping. For example, when the closed-loop scheme is used, a base station determines the precoding weight by considering the codebook index provided from a mobile station. In so doing, when the corresponding matrix is used together, the base station instructs the mobile station not to use the precoding code which cannot uniformly distribute the power of the physical antennas. Hence, even when the corresponding matrix is used together, the base station can use only the precoding code which can uniformly distribute the power of the physical antennas.

In step 205, the transmitting stage precodes each virtual antenna signal with the confirmed precoding weight.

In step 207, the transmitting stage determines the corresponding matrix determined based on the precoding weight. For example, the transmitting stage confirms the corresponding matrix as expressed in Equation 3, which satisfies the conditions of Equation 4 and Equation 5.

In step 209, the transmitting stage maps the virtual antenna signals to the physical antennas using the corresponding matrix. That is, the transmitting stage generates the physical antenna signals by linearly combining the virtual antenna signals using the corresponding matrix.

Next, the transmitting stage finishes this process. The transmitting stage sends the generated physical antenna signals over the respective physical antennas.

Although it is not illustrated here, the transmitting stage precodes the virtual antenna signals, and generates the virtual antenna signals to send over the respective virtual antennas by combining the precoded signal with the reference signal to send over the virtual antennas.

In this embodiment, the transmitting stage precodes the virtual antenna signal.

Alternatively, the transmitting stage may generate the virtual antenna signals to send over the respective virtual antennas by precoding at least one traffic channel. The transmitting stage generates the virtual antenna signals to send over the respective virtual antennas by combining the virtual antenna signals generated using the precoding and the reference signal to send over the virtual antennas.

Hereafter, a structure of the transmitting stage for mapping the virtual antennas and the physical antennas is described.

FIG. 3 is a block diagram of the transmitting stage in the multi-antenna system according to an embodiment of the present invention.

The transmitting stage of FIG. 3 includes a traffic channel signal generator 300, encoders 302-1 through 302-$N_s$, modulators 304-1 through 304-$N_s$, a precoder 306, a virtual antenna signal generator 308, a virtual antenna mapper 310, Radio Frequency (RF) processors 312-1 through 312-$N_T$, a reference signal generator 314, a mapping controller 316, a weight controller 318, and a feedback receiver 320.

The traffic channel signal generator 300 generates $N_s$ traffic channels having independent information. $N_s$ denotes the number of streams spatially separated, and ranges from 1 to $N_k$. Herein, $N_k$ denotes the number of the virtual antennas.

The encoders 302-1 through 302-$N_s$ encode the traffic channels output from the traffic channel signal generator 300 at a modulation level adequate for the channel state. Herein, the modulation level indicates a Modulation and Coding Scheme (MCS) level.

The modulators 304-1 through 304-$N_s$ modulate the encoded signals output from the encoders 302-1 through 302-$N_s$ according to the modulation level suitable for the channel state.

The precoder 306 precodes the $N_s$ traffic channels output from the modulators 304-1 through 304-$N_s$ to $N_k$ virtual antenna signals with a precode provided from the weight controller 318.

The weight controller 318 generates the precode by taking account of the codebook index output from the feedback receiver 320.

The weight controller 318 instructs the serviced receiving stage not to use the precoding vector which cannot be used with the corresponding matrix. For example, when the codebook of the rank 1 precoding vector of the downlink closed-loop codebook of the LIE standard is used, the weight controller 318 instructs the receiving stage not to use the fourth through seventh precoding vectors.

The feedback receiver 320 receives feedback information of the receiving stage.

The virtual antenna signal generator 308 generates the virtual antenna signals to send over the respective virtual antennas by combining the precoded traffic channel signals output from the precoder 306 and the reference signal output from the reference signal generator 314.

The reference signal generator 314 generates the virtual antenna reference signal to send over the virtual antennas. For example, the reference signal includes a pilot.

The virtual antenna mapper 310 maps the virtual antenna signals fed from the virtual antenna signal generator 308 to the physical antennas using the corresponding matrix provided from the mapping controller 316. More specifically, the virtual antenna mapper 310 generates the signals for the physical antennas by linearly combining the virtual antenna signals output from the virtual antenna signal generator 308 using the corresponding matrix provided from the mapping controller 316.

The mapping controller 316 determines the corresponding matrix to map the virtual antennas and the physical antennas at the virtual antenna mapper 310. For example, the mapping controller 316 selects any one of the corresponding matrices of Equation 7 designed based on Equation 3 which meets the conditions of Equation 4 and Equation 5. The corresponding matrices of Equation 7 are designed by taking into account the properties of the precoding codebook and to satisfy the conditions (1), (2) and (3). For example, the mapping controller 316 may generate the corresponding matrix of Equation 3 which meets the conditions of Equation 4 and Equation 5. In this situation, the mapping controller 316 generates the corresponding matrix by taking into account the properties of the precoding codebook and to satisfy the conditions (1), (2) and (3).

The RF processors 312-1 through 312-$N_T$ convert the physical antenna signals output from the virtual antenna mapper 310 to analog signals. Next, the RF processors 312-1 through 312-$N_T$ convert the analog signals to RF signals and transmit the RF signals over the corresponding physical antenna.

As set forth above, by mapping the virtual antennas and the physical antennas in the many-to-many correspondence in the multi-antenna system, it is advantageous to uniformly distribute the power to the physical antennas.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a signal at a transmitting stage of a wireless communication system, the method comprising:
   generating at least two virtual antenna signals for at least two virtual antennas;
   precoding the at least two virtual antenna signals;
   generating at least two physical antenna signals by applying a corresponding matrix to the at least two precoded virtual antenna signals, the corresponding matrix mapping the at least two precoded virtual antennas and the at least two physical antennas in a many-to-many relation; and transmitting the at least two physical antenna signals over respective physical antennas.

2. The method of claim 1, wherein the generating of the physical antenna signals comprises:

generating at least two physical antenna signals by linearly combining the at least two precoded virtual antenna signals using the corresponding matrix.

3. The method of claim 2, further comprising:

when a closed-loop precoding scheme is used, instructing a receiving stage not to use at least one precoding vector that is unusable with the corresponding matrix in a codebook.

4. The method of claim 1, wherein the generating of the physical antenna signals comprises:

when there are four virtual antennas and four physical antennas, generating two physical antenna signals by linearly combining the 0-th virtual antenna signal and the second virtual antenna signal, and generating two different physical antenna signals by linearly combining the first virtual antenna signal and the third virtual antenna signal.

5. The method of claim 1, wherein, when there are four virtual antennas and four physical antennas, the corresponding matrix is expressed as the following matrix:

$$\frac{1}{\sqrt{2}}\begin{bmatrix} a & 0 & b & 0 \\ 0 & e & 0 & f \\ c & 0 & d & 0 \\ 0 & g & 0 & h \end{bmatrix}$$

where a, b, c, d, e, f, g, h denote elements of the corresponding matrix defined to have unitary properties of the corresponding matrix, and the elements indicate complex numbers of the same absolute value.

6. The method of claim 1, wherein, when there are four virtual antennas and four physical antennas, the corresponding matrix is any one of the following matrices:

$$\frac{1}{\sqrt{2}}\begin{bmatrix} a & 0 & ja & 0 \\ 0 & e & 0 & je \\ c & 0 & -jc & 0 \\ 0 & g & 0 & -jg \end{bmatrix} \text{ or } \frac{1}{\sqrt{2}}\begin{bmatrix} a & 0 & -ja & 0 \\ 0 & e & 0 & je \\ c & 0 & jc & 0 \\ 0 & g & 0 & -jg \end{bmatrix}$$

$$\text{or } \frac{1}{\sqrt{2}}\begin{bmatrix} a & 0 & ja & 0 \\ 0 & e & 0 & -je \\ c & 0 & -jc & 0 \\ 0 & g & 0 & jg \end{bmatrix} \text{ or } \frac{1}{\sqrt{2}}\begin{bmatrix} a & 0 & -ja & 0 \\ 0 & e & 0 & -je \\ c & 0 & jc & 0 \\ 0 & g & 0 & jg \end{bmatrix}$$

where, $|a| = |c| = |e| = |g| = 1$ where a, c, e, g denote elements of the corresponding matrix defined to have unitary properties of the corresponding matrix, and the elements indicate random complex numbers of the absolute number 1.

7. The method of claim 1, wherein, when there are four virtual antennas and four physical antennas, the corresponding matrix is any one of the following matrices:

$$\frac{a}{\sqrt{2}}\begin{bmatrix} 1 & 0 & j & 0 \\ 0 & j & 0 & -1 \\ -j & 0 & -1 & 0 \\ 0 & 1 & 0 & -j \end{bmatrix} \text{ or } \frac{a}{\sqrt{2}}\begin{bmatrix} 1 & 0 & j & 0 \\ 0 & -j & 0 & 1 \\ -j & 0 & -1 & 0 \\ 0 & -1 & 0 & j \end{bmatrix}$$

$$\text{or } \frac{a}{\sqrt{2}}\begin{bmatrix} 1 & 0 & j & 0 \\ 0 & j & 0 & -1 \\ j & 0 & 1 & 0 \\ 0 & -1 & 0 & j \end{bmatrix} \text{ or } \frac{a}{\sqrt{2}}\begin{bmatrix} 1 & 0 & j & 0 \\ 0 & -j & 0 & 1 \\ j & 0 & 1 & 0 \\ 0 & 1 & 0 & -j \end{bmatrix}$$

$$\text{or } \frac{a}{\sqrt{2}}\begin{bmatrix} 1 & 0 & -j & 0 \\ 0 & -1 & 0 & -j \\ j & 0 & -1 & 0 \\ 0 & j & 0 & 1 \end{bmatrix} \text{ or } \frac{a}{\sqrt{2}}\begin{bmatrix} 1 & 0 & -j & 0 \\ 0 & 1 & 0 & j \\ j & 0 & -1 & 0 \\ 0 & -j & 0 & -1 \end{bmatrix}$$

$$\text{or } \frac{a}{\sqrt{2}}\begin{bmatrix} 1 & 0 & -j & 0 \\ 0 & 1 & 0 & j \\ -j & 0 & 1 & 0 \\ 0 & j & 0 & 1 \end{bmatrix} \text{ or } \frac{a}{\sqrt{2}}\begin{bmatrix} 1 & 0 & -j & 0 \\ 0 & -1 & 0 & -j \\ -j & 0 & 1 & 0 \\ 0 & -j & 0 & -1 \end{bmatrix}$$

$$\text{or } \frac{a}{\sqrt{2}}\begin{bmatrix} 1 & 0 & j & 0 \\ 0 & 1 & 0 & -j \\ -j & 0 & -1 & 0 \\ 0 & j & 0 & -1 \end{bmatrix} \text{ or } \frac{a}{\sqrt{2}}\begin{bmatrix} 1 & 0 & j & 0 \\ 0 & -1 & 0 & j \\ -j & 0 & -1 & 0 \\ 0 & -j & 0 & 1 \end{bmatrix}$$

$$\text{or } \frac{a}{\sqrt{2}}\begin{bmatrix} 1 & 0 & j & 0 \\ 0 & -1 & 0 & j \\ j & 0 & 1 & 0 \\ 0 & j & 0 & -1 \end{bmatrix} \text{ or } \frac{a}{\sqrt{2}}\begin{bmatrix} 1 & 0 & j & 0 \\ 0 & 1 & 0 & -j \\ j & 0 & 1 & 0 \\ 0 & -j & 0 & 1 \end{bmatrix}$$

$$\text{or } \frac{a}{\sqrt{2}}\begin{bmatrix} 1 & 0 & -j & 0 \\ 0 & j & 0 & 1 \\ j & 0 & -1 & 0 \\ 0 & -1 & 0 & -j \end{bmatrix} \text{ or } \frac{a}{\sqrt{2}}\begin{bmatrix} 1 & 0 & -j & 0 \\ 0 & -j & 0 & -1 \\ j & 0 & -1 & 0 \\ 0 & 1 & 0 & j \end{bmatrix}$$

$$\text{or } \frac{a}{\sqrt{2}}\begin{bmatrix} 1 & 0 & -j & 0 \\ 0 & j & 0 & 1 \\ -j & 0 & 1 & 0 \\ 0 & 1 & 0 & j \end{bmatrix} \text{ or } \frac{a}{\sqrt{2}}\begin{bmatrix} 1 & 0 & -j & 0 \\ 0 & -j & 0 & -1 \\ -j & 0 & 1 & 0 \\ 0 & -1 & 0 & -j \end{bmatrix}$$

where $|a| = 1$.

8. The method of claim 1, further comprising:

when a closed-loop precoding scheme is used, instructing a receiving stage not to use at least one precoding vector that is unusable with the corresponding matrix in a codebook.

9. The method of claim 8, wherein the at least one precoding vector comprises a precoding vector that does not satisfy all of a condition that both of a 0-th weight and a second weight of the precoding vector are real numbers, and a condition that both of a first weight and a third weight of the precoding vector are real or imaginary numbers.

10. An apparatus for transmitting a signal at a transmitting stage of a wireless communication system, the apparatus comprising:

at least two physical antennas;
a signal generator configured to generate at least two virtual antenna signals for at least two virtual antennas; and
a precoder configured to precode the at least two virtual antenna signals generated by the signal generator;
a virtual antenna mapper configured to:
generate at least two physical antenna signals by applying a corresponding matrix to the at least two precoded virtual antenna signals, the corresponding matrix mapping the at least two precoded virtual antennas and the at least two physical antennas in a many-to-many relation; and provide the at least two physical antenna signals to the respective physical antennas.

11. The apparatus of claim 10, wherein the virtual antenna mapper generates at least two physical antenna signals by linearly combining the at least two precoded virtual antenna signals using the corresponding matrix.

12. The apparatus of claim 11, further comprising:
a weight controller configured, when a closed-loop precoding scheme is used, to instruct a receiving stage not to use at least one precoding vector that is unusable with the corresponding matrix in a codebook.

13. The apparatus of claim 10, wherein, when there are four virtual antennas and four physical antennas, the virtual antenna mapper generates two physical antenna signals by linearly combining the 0-th virtual antenna signal and the second virtual antenna signal, and generates two different physical antenna signals by linearly combining the first virtual antenna signal and the third virtual antenna signal.

14. The apparatus of claim 10, wherein, when there are four virtual antennas and four physical antennas, the corresponding matrix is expressed as the following matrix:

$$\frac{1}{\sqrt{2}}\begin{bmatrix} a & 0 & b & 0 \\ 0 & e & 0 & f \\ c & 0 & d & 0 \\ 0 & g & 0 & h \end{bmatrix}$$

where a, b, c, d, e, f, g, h denote elements of the corresponding matrix defined to have unitary properties of the corresponding matrix, and the elements indicate complex numbers of the same absolute value.

15. The apparatus of claim 10, wherein, when there are four virtual antennas and four physical antennas, the corresponding matrix is any one of the following matrices:

$$\frac{1}{\sqrt{2}}\begin{bmatrix} a & 0 & ja & 0 \\ 0 & e & 0 & je \\ c & 0 & -jc & 0 \\ 0 & g & 0 & -jg \end{bmatrix} \text{ or } \frac{1}{\sqrt{2}}\begin{bmatrix} a & 0 & -ja & 0 \\ 0 & e & 0 & je \\ c & 0 & jc & 0 \\ 0 & g & 0 & -jg \end{bmatrix}$$

$$\text{or } \frac{1}{\sqrt{2}}\begin{bmatrix} a & 0 & ja & 0 \\ 0 & e & 0 & -je \\ c & 0 & -jc & 0 \\ 0 & g & 0 & jg \end{bmatrix} \text{ or } \frac{1}{\sqrt{2}}\begin{bmatrix} a & 0 & -ja & 0 \\ 0 & e & 0 & -je \\ c & 0 & jc & 0 \\ 0 & g & 0 & jg \end{bmatrix}$$

where, $|a| = |c| = |e| = |g| = 1$ where a, c, e, g denote elements of the corresponding matrix defined to have unitary properties of the corresponding matrix, and the elements indicate random complex numbers of the absolute number 1.

16. The apparatus of claim 10, wherein, when there are four virtual antennas and four physical antennas, the corresponding matrix is any one of the following matrices:

$$\frac{a}{\sqrt{2}}\begin{bmatrix} 1 & 0 & j & 0 \\ 0 & j & 0 & -1 \\ -j & 0 & -1 & 0 \\ 0 & 1 & 0 & -j \end{bmatrix} \text{ or } \frac{a}{\sqrt{2}}\begin{bmatrix} 1 & 0 & j & 0 \\ 0 & -j & 0 & 1 \\ -j & 0 & -1 & 0 \\ 0 & -1 & 0 & j \end{bmatrix}$$

$$\text{or } \frac{a}{\sqrt{2}}\begin{bmatrix} 1 & 0 & j & 0 \\ 0 & j & 0 & -1 \\ j & 0 & 1 & 0 \\ 0 & -1 & 0 & j \end{bmatrix} \text{ or } \frac{a}{\sqrt{2}}\begin{bmatrix} 1 & 0 & j & 0 \\ 0 & -j & 0 & 1 \\ j & 0 & 1 & 0 \\ 0 & 1 & 0 & -j \end{bmatrix}$$

$$\text{or } \frac{a}{\sqrt{2}}\begin{bmatrix} 1 & 0 & -j & 0 \\ 0 & -1 & 0 & -j \\ j & 0 & -1 & 0 \\ 0 & j & 0 & 1 \end{bmatrix} \text{ or } \frac{a}{\sqrt{2}}\begin{bmatrix} 1 & 0 & -j & 0 \\ 0 & 1 & 0 & j \\ j & 0 & -1 & 0 \\ 0 & -j & 0 & -1 \end{bmatrix}$$

$$\text{or } \frac{a}{\sqrt{2}}\begin{bmatrix} 1 & 0 & -j & 0 \\ 0 & 1 & 0 & j \\ -j & 0 & 1 & 0 \\ 0 & j & 0 & 1 \end{bmatrix} \text{ or } \frac{a}{\sqrt{2}}\begin{bmatrix} 1 & 0 & -j & 0 \\ 0 & -1 & 0 & -j \\ -j & 0 & 1 & 0 \\ 0 & -j & 0 & -1 \end{bmatrix}$$

$$\text{or } \frac{a}{\sqrt{2}}\begin{bmatrix} 1 & 0 & j & 0 \\ 0 & 1 & 0 & -j \\ -j & 0 & -1 & 0 \\ 0 & j & 0 & -1 \end{bmatrix} \text{ or } \frac{a}{\sqrt{2}}\begin{bmatrix} 1 & 0 & j & 0 \\ 0 & -1 & 0 & j \\ -j & 0 & -1 & 0 \\ 0 & -j & 0 & 1 \end{bmatrix}$$

$$\text{or } \frac{a}{\sqrt{2}}\begin{bmatrix} 1 & 0 & j & 0 \\ 0 & -1 & 0 & j \\ j & 0 & 1 & 0 \\ 0 & j & 0 & -1 \end{bmatrix} \text{ or } \frac{a}{\sqrt{2}}\begin{bmatrix} 1 & 0 & j & 0 \\ 0 & 1 & 0 & -j \\ j & 0 & 1 & 0 \\ 0 & -j & 0 & 1 \end{bmatrix}$$

$$\text{or } \frac{a}{\sqrt{2}}\begin{bmatrix} 1 & 0 & -j & 0 \\ 0 & j & 0 & 1 \\ j & 0 & -1 & 0 \\ 0 & -1 & 0 & -j \end{bmatrix} \text{ or } \frac{a}{\sqrt{2}}\begin{bmatrix} 1 & 0 & -j & 0 \\ 0 & -j & 0 & -1 \\ j & 0 & -1 & 0 \\ 0 & 1 & 0 & j \end{bmatrix}$$

$$\text{or } \frac{a}{\sqrt{2}}\begin{bmatrix} 1 & 0 & -j & 0 \\ 0 & j & 0 & 1 \\ -j & 0 & 1 & 0 \\ 0 & 1 & 0 & j \end{bmatrix} \text{ or } \frac{a}{\sqrt{2}}\begin{bmatrix} 1 & 0 & -j & 0 \\ 0 & -j & 0 & -1 \\ -j & 0 & 1 & 0 \\ 0 & -1 & 0 & -j \end{bmatrix}$$

where $|a| = 1$.

17. The apparatus of claim 10, further comprising:
a weight controller configured, when a closed-loop precoding scheme is used, to instruct a receiving stage not to use at least one precoding vector that is unusable with the corresponding matrix in a codebook.

18. The apparatus of claim 17, wherein the weight controller recognizes a precoding vector that does not satisfy all of a condition that both of a 0-th weight and a second weight of the precoding vector are real numbers, and a condition that both of a first weight and a third weight of the precoding vector are real or imaginary numbers, as the precoding vector unusable with the corresponding matrix.

19. The apparatus of claim 10, further comprising:
at least two encoders, each encoder configured to encode one of the at least two virtual antenna signals.

20. The apparatus of claim 10, further comprising:
a reference signal generator configured to generate a virtual antenna reference signal that is sent over the at least two virtual antennas.

* * * * *